Sept. 5, 1950      D. H. WAARA      2,521,317

MOLDING CLIP

Filed July 17, 1946

Inventor
DAVID H. WAARA
By his Attorney

Patented Sept. 5, 1950

2,521,317

UNITED STATES PATENT OFFICE 2,521,317

MOLDING CLIP

David H. Waara, Detroit, Mich., assignor to Robert L. Brown, Ferndale, Mich.

Application July 17, 1946, Serial No. 684,221

3 Claims. (Cl. 24—213)

This invention relates to moldings, trim strips and like construction and more particularly to improved means for securing finishing objects to supporting surfaces, especially those readily accessible from one side only.

A primary object of the invention is to provide a spring clip fastening device which is designed to secure cooperating members in assembled relation under continuously effective spring tension.

Another object of the invention is to provide a plurality of fastening devices which are readily applied to a hollow molding having spaced inturned flanges so disposed with respect to each other as to permit quick easy insertion of the devices into a work aperture by flexing, yet, when in fastening position, have such a degree of stiffness, rigidity and tension stored therein through contact and compression against the side walls of the aperture that tension is set up in the shank sections whereby substantial resistance is offered to withdrawal of the devices.

A further object of the invention is to provide a fastening device which may be readily snapped into the molding by hooking one side to one under flange and snapping the other side into holding position with the opposite under flange.

A further object of the invention is to provide a flexible head portion to accommodate variations in the molding height together with a flexible shank portion for resiliently engaging an aperture when pressed into holding position.

Other objects and advantages of the invention will be more fully understood from the following description taken in connection with the accompanying drawings in which.

Figure 1:
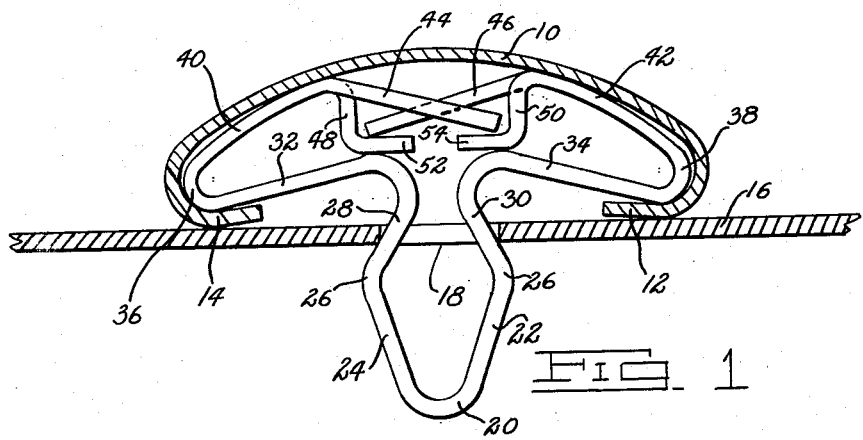
Fig. 1 illustrates a form of the improved molding construction, the attaching clip being shown in side elevation with the molding illustrated in section.
Figure 2:
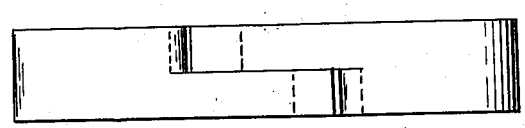
Fig. 2 is a top plan view of the clip shown in Fig. 1.
Figure 3:
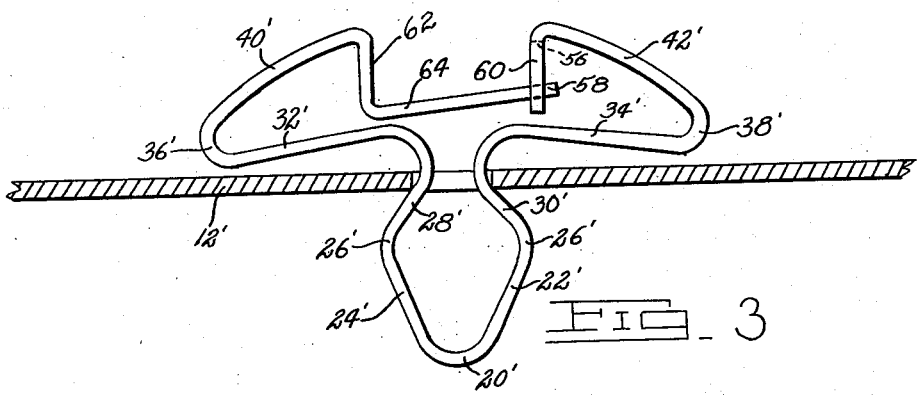
Fig. 3 illustrates a modified form of the invention showing the clip in side elevation and apertured supporting structure in section.
Figure 4:
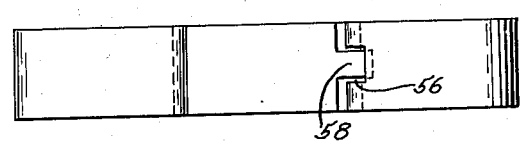
Fig. 4 is a top plan view of the clip shown in Fig. 3.

Referring to the drawings, 10 represents a hollow molding or trim strip provided with the usual inturned flanges 12 and 14 which is to be mounted on an apertured supporting member 16. In mounting the molding, the supporting structure is previously provided with spaced apertures 18. The clips are assembled in the molding and the molding is assembled by springing the projecting shanks of the clips into the apertures so provided by a simple axial force.

The clip comprises a one-piece sheet metal stamping, preferably spring steel, of rectangular form. The blank is bent substantially at its center to U shape forming a leading end 20 and outwardly diverging shank elements 22 and 24. Work engaging shoulders 26 are formed by inwardly diverging elements 28 and 30. The shank elements carry the head member of the device which is formed by outwardly and downwardly bending sections 32 and 34 and then bending the strip ends toward each other forming flange engaging portions 36 and 38 and sections 40 and 42 conforming generally to the inner surface of the molding.

The free ends of the strip are sheared longitudinally to provide two strips at each end. The ends are brought into overlapping relation with one strip at opposite sides of the clip, designated by the numerals 44 and 46, bent downwardly. The other strips, 48 and 50, underlie the strips 44 and 46 and are bent downwardly and inwardly providing right angle members for receiving the outer ends of the strips 44 and 46. The ends 52 and 54 of the angle members rest upon the upper portion of the sections 32 and 34.

In the modified form of the invention, the strip is formed substantially the same as above described except that the free ends of the strips are not sheared. One end is provided with a notch 56 and the other end is provided with an outwardly extending tab 58. The end having the notch is bent downwardly forming a section 60. The end having the tab is bent downwardly forming a section 62 and then horizontally toward the section 60 forming a section 64 with the tab 58 received in the notch 56.

The frictional engagement of the head sections in the molding is such that they are firmly held therein so that the clips remain in their applied position in registry with the holes in the supporting structure. When the shanks of the clips are sprung into the apertures of the supporting structure they are more firmly held in the molding by the spring action of the head.

While this invention has been described in detail with specific examples, it will be understood that various changes including the size, shape and arrangement of parts may be made without departing from the spirit of my invention and it is not my intention to limit its scope other than by the terms of the appended claims.

I claim:

1. A clip for mounting a hollow molding having spaced inturned flanges onto an apertured supporting structure comprising, a shank portion having a pair of shank elements connected at their leading end and having shoulders deformed therefrom outwardly of the planes thereof and adapted for anchoring engagement in the aperture in the supporting structure, and a head member comprising oppositely disposed yieldable sections in the form of reversely bent loops, the outer ends of which are divided each forming two side by side end sections, one of which engages the upper end of one shank element and the other of which overlies and is in engagement with the opposite end section.

2. A clip for mounting a hollow molding having spaced inturned flanges onto an apertured supporting structure comprising a shank portion having a pair of shank elements connected at their leading end and having shoulders deformed therefrom outwardly of the planes thereof and adapted for anchoring engagement in the aperture in the supporting structure, and a head member comprising oppositely disposed yieldable sections in the form of reversely bent loops, the outer ends of which are divided each forming two side by side end sections, one side of one end section being in lateral engagement with a corresponding section of the opposite end section and the opposite sides of the divided end sections being in engagement each with one of the shank elements respectively.

3. A clip for mounting a hollow molding having spaced inturned flanges onto an apertured supporting structure comprising a shank portion having a pair of shank elements connected at their leading end and having shoulders deformed therefrom outwardly of the planes thereof and adapted for anchoring engagement in the aperture in the supporting structure, and a head member comprising oppositely disposed yieldable sections in the form of reversely bent loops, the outer ends of which are divided each forming two side by side end sections, one side of one end section being in lateral engagement with a corresponding section of the opposite end section and the opposite sides of the divided end sections being in engagement each with one of the shank elements respectively and the first mentioned end sections respectively.

DAVID H. WAARA.

REFERENCES CITED

The following references are of record in the file of this patent:

UNITED STATES PATENTS

| Number | Name | Date |
|---|---|---|
| 2,139,567 | Van Uum | Dec. 6, 1938 |
| 2,156,669 | Van Uum | May 2, 1939 |
| 2,198,186 | Tinnerman | Apr. 23, 1940 |
| 2,201,509 | Van Uum | May 21, 1940 |
| 2,221,009 | Van Uum | Nov. 12, 1940 |
| 2,229,802 | Dyresen | Jan. 28, 1941 |
| 2,246,720 | Churchill | June 24, 141 |
| 2,275,119 | Wiley | Mar. 3, 1942 |
| 2,286,988 | Jones | June 16, 1942 |